A. LYMBURNER.
BELL CONTROLLING DEVICE.
APPLICATION FILED DEC. 24, 1921.

1,435,168. Patented Nov. 14, 1922.

INVENTOR
A. Lymburner

Attorney.

Patented Nov. 14, 1922.

1,435,168

UNITED STATES PATENT OFFICE.

ARMAND LYMBURNER, OF NOTRE DAME DE GRACE, QUEBEC, CANADA.

BELL-CONTROLLING DEVICE.

Application filed December 24, 1921. Serial No. 524,802.

*To all whom it may concern:*

Be it known that I, ARMAND LYMBURNER, a citizen of the United States of America, residing at 13ª Havard Ave., in Notre Dame de Grace, in the Province of Quebec, in the Dominion of Canada, have invented certain new and useful Improvements in a Bell-Controlling Device; and I do hereby declare that the following is a true, correct, and clear description of the same.

The present invention relates to improvements in a controlling device for locomotive bells which is herein fully described in the following description and illustrated in the accompanying drawings, in which:—

Like numerals of reference indicate corresponding parts in each figure.

Figure 1:
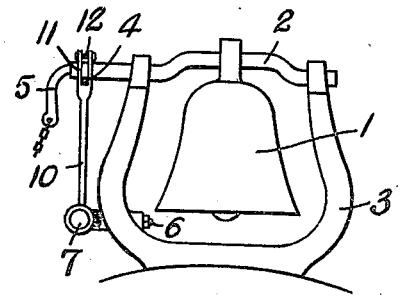
Figure 1 is a side elevation of a locomotive bell provided with the controlling device.
Figure 2:
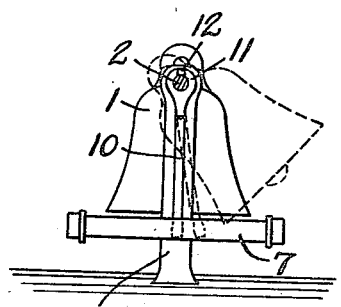
Figure 2 is an end elevation of the bell provided with the bell control.

Referring to the drawings, 1 is a locomotive bell mounted on the shaft 2, said shaft being journalled in suitable bearings in the supporting bracket 3.

One end of said shaft projects outwardly from said bracket and is provided with a pin or lug 4 and a lever 5 to operate said bell.

Figure 3:
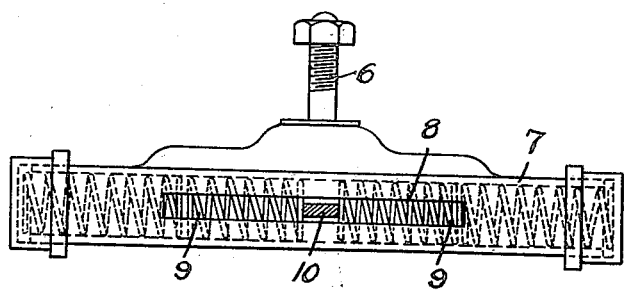
Figure 3 is an enlarged plan elevation of the controlling device detached from the bell.

Suitably secured to said supporting bracket 3 by means of the bolt 6 is the shock absorber which consists of a tubular casing 7 closed at both ends and provided with a longitudinal slot 8. Within said tubular casing 7 is provided two spiral springs 9, each spring abutting at the end of the casing. 10 is a lever provided at one end with a fork 11 which is connected at its uppermost end by a cross-bar 12. The fork end of the lever 10 is loosely mounted at the end of the shaft 2, while the other end engages in between the spiral springs 9, as disclosed in Figure 3 of its drawings.

When the bell is rung by means of the lever 5, the pin or lug 4 carried with the shaft 2 will strike against the stop-member or cross-bar 12, causing a pressure on the lever 10 which will be absorbed by the springs 9, and thus preventing the bell from making a complete turn on its support.

What I claim as my invention is:—

1. A device of the character described; in combination with a bell and shaft; comprising a lever loosely mounted at one end on said shaft; resilient means at the other end of said lever; and means on said shaft adapted to actuate said lever at a predetermined point.

2. A device of the character described; in combination with a bell and shaft; comprising a casing suitably secured adjacent said bell; a resilient element within said casing; a lever loosely mounted at one end on said shaft, the other end of said lever contacting with said resilient element; and means on said shaft adapted to actuate said lever at a predetermined point.

3. A device of the character described; in combination with a bell and shaft; a horizontal casing suitably secured adjacent said bell; a resilient element within said casing; a lever loosely mounted at one end on said shaft, the other end of said lever contacting with said resilient element; and means on said shaft adapted to engage said lever whereby said lever will be actuated at a predetermined point.

Signed at Montreal, Quebec, Canada, this 26th day of July, 1921.

ARMAND LYMBURNER.

Witnesses:
C. PATENAUDE,
G. PILESSIER.